Feb. 22, 1938.    A. E. DENTLER    2,109,367
SHOCK ABSORBER
Filed July 5, 1935    2 Sheets-Sheet 1
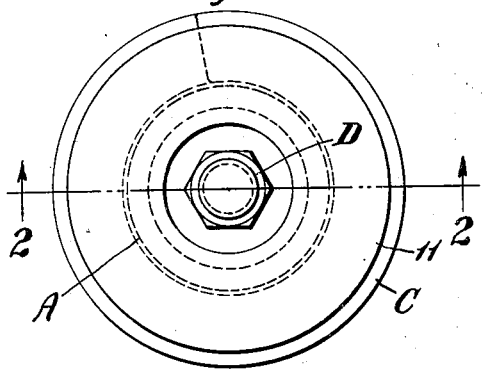
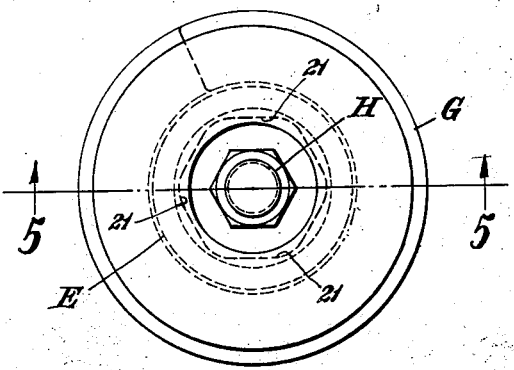
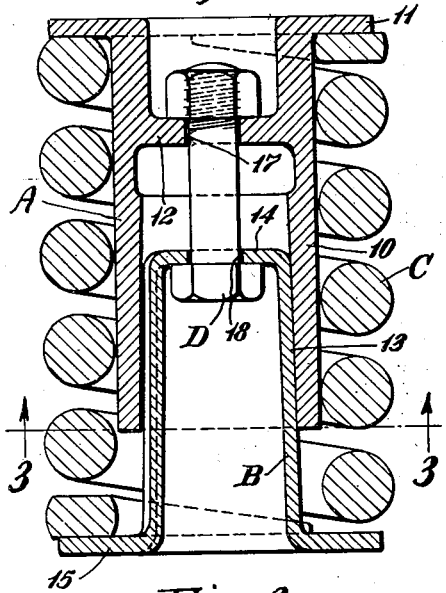
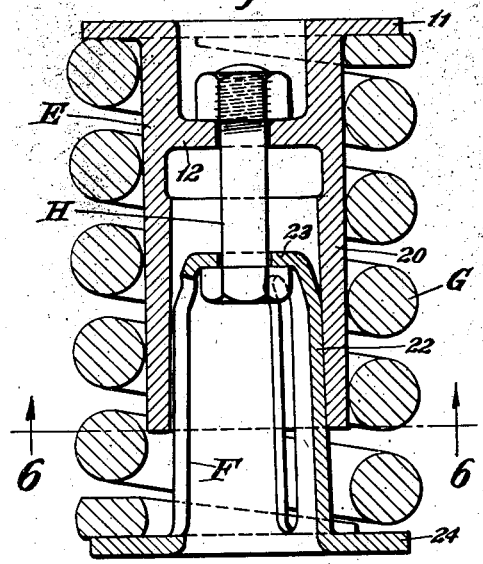
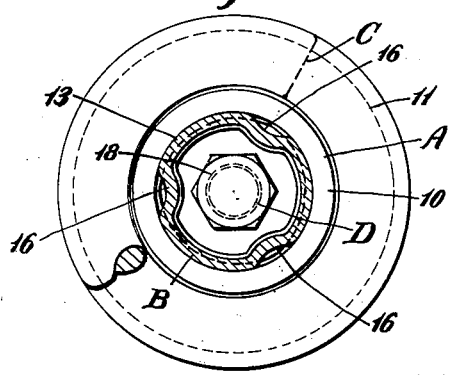
Inventor
Arnold E. Dentler
By Henry Fuchs Atty.

Feb. 22, 1938.  A. E. DENTLER  2,109,367
SHOCK ABSORBER
Filed July 5, 1935  2 Sheets-Sheet 2
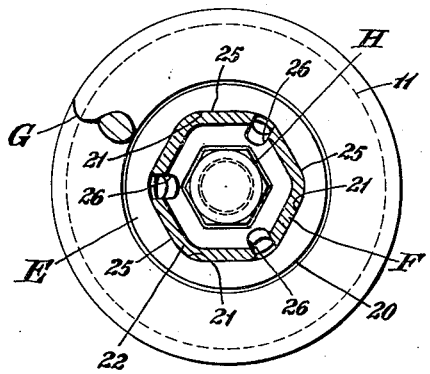
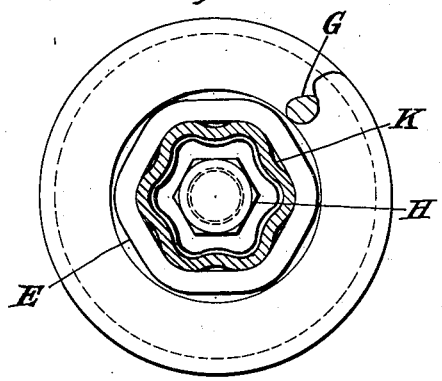
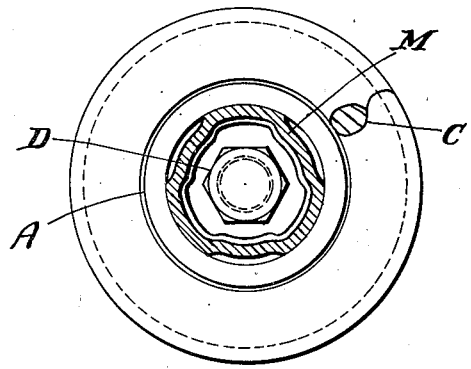
Inventor
Arnold E. Dentler
By Henry Fuchs
Atty.

Patented Feb. 22, 1938

2,109,367

UNITED STATES PATENT OFFICE 2,109,367

SHOCK ABSORBER

Arnold E. Dentler, Hinsdale, Ill., assignor to W. H. Miner, Inc., Chicago, Ill., a corporation of Delaware Application July 5, 1935, Serial No. 29,823

11 Claims. (Cl. 267—9)

This invention relates to improvements in shock absorbers especially adapted for use as snubbing devices in connection with springs of railway car trucks.

One object of the invention is to provide a shock absorber of simple design, especially adapted for use as a snubber in connection with truck springs of railway cars and replacing one of the coils of each cluster of coil springs of such car trucks, preferably the center coil.

Another object of the invention is to provide a friction shock absorbing mechanism of the character described in the preceding paragraph which effectively snubs the action of truck springs to reduce the number of oscillations thereof and thereby protect the lading of the car from damage.

A more specific object of the invention is to provide an efficient friction snubber comprising few parts, which may be economically manufactured at the minimum cost.

Other objects of the invention will more clearly appear from the description and claims hereinafter following.

In the drawings forming a part of this specification, Figure 1 is a top plan view of my improved snubber. Figure 2 is a vertical sectional view, corresponding substantially to the line 2—2 of Figure 1. Figure 3 is a horizontal sectional view, corresponding substantially to the line 3—3 of Figure 2. Figure 4 is a view similar to Figure 1, illustrating another embodiment of the invention. Figure 5 is a vertical sectional view, corresponding to the line 5—5 of Figure 4. Figure 6 is a horizontal sectional view, corresponding to the line 6—6 of Figure 5. Figure 7 is a view, similar to Figure 6, illustrating a further embodiment of the invention. Figure 8 is a view similar to Figure 3, illustrating still another embodiment of the invention.

Referring first to the embodiment of the invention illustrated in Figures 1, 2, and 3, my improved shock absorber, or snubber, comprises broadly: a friction casing A; a contractible friction member B telescoped within the casing; a spring resistance C; and a retaining bolt D.

The friction casing A is in the form of a substantially tubular member having the friction shell section 10 proper thereof formed at the inner end. As most clearly shown in Figure 2, the friction shell section 10 tapers inwardly of the casing A and presents transversely curved, interior friction surfaces. At the outer or upper end, the casing A is provided with an exterior, horizontally projecting, annular flange 11, which forms a spring abutment. Between the friction shell section 10 and the upper end of the casing A is a transverse, interior wall 12 for a purpose hereinafter more fully described.

The contractible friction member B is of one-piece construction and comprises a substantially tubular section 13 having a transverse end wall 14 at the inner end thereof, closing the same, and a laterally, outwardly projecting, horizontal spring abutment flange 15 at the outer or lower end thereof. The tubular section 13 is telescoped within the friction shell section 10 of the casing A and is inwardly tapered, as clearly shown in Figure 2, to properly cooperate with the interior friction surfaces of the shell. The walls of the tubular section 13 are longitudinally corrugated, as indicated at 16, 16, and 16, as most clearly shown in Figure 3. The corrugations 16, 16, and 16 extend inwardly and permit a certain amount of radial contraction of the tubular section 13. The member B is formed of resilient spring material so as to permit the contraction thereof.

The spring C, which opposes relative movement of the friction casing A and the friction member B toward each other, surrounds the friction casing and has its opposite ends bearing respectively on the flanges 11 and 15 of the casing A and the friction member B.

The parts of the shock absorber are held assembled and of uniform overall length by the retainer bolt D, which extends through openings 17 and 18 in the wall 12 of the casing A and the end wall 14 of the friction member B. The headed lower end of the bolt is disposed within the hollow portion of the friction member B and has shouldered engagement with the wall 14 thereof. The nut of the bolt which, as shown in Figure 2, is disposed at the upper end thereof, has shouldered engagement with the wall 12 of the casing A. As will be evident, the bolt D limits relative separation of the casing A and the friction member B and may be adjusted by means of the nut to obtain the proper overall length of the mechanism.

As will be understood by those versed in this art, the snubbing device shown in Figures 1, 2, and 3 is substituted for one of the spring coils of a cluster of truck springs and cooperates with the top and bottom spring follower plates of the spring cluster. Although it is preferable to substitute the snubber for the central coils of a cluster of springs, the use thereof is not limited thereto and such snubbers may be substituted for several of the spring coils of a spring cluster.

In the operation of my improved snubber, as shown in Figures 1, 2, and 3, upon the springs of the spring cluster of the truck of a railway car being compressed, the friction member B will be forced inwardly of the friction casing A, opposed by the resistance of the spring C. Due to the friction existing between the friction surfaces of the friction member and the friction surfaces of the friction shell section 10 of the casing A, oscillation of the cluster of springs will be effectively reduced. Inasmuch as the friction shell is tapered inwardly and the tubular section of the friction member B is yieldable and may contract radially, the friction resistance between the casing A and the friction member B will be gradually increased as the friction member B moves inwardly of the tapered friction shell section 10. When the coils of the truck spring cluster expand and the spring follower plates of said cluster are moved apart, the friction member B and the casing A will also be forced apart by expansion of the spring C. The separation of the friction casing A and member B is limited by the retainer bolt D, as hereinbefore pointed out.

Referring next to the embodiment of the invention illustrated in Figures 4, 5, and 6, my improved snubbing device comprises a friction casing E, provided with a friction shell section of hexagonal, interior cross section; a yieldable split friction member F; a spring resistance G opposing relative movement of the casing E and friction member F; and a retainer bolt H.

The friction casing E is of similar design to the friction casing A hereinbefore described in connection with Figures 1, 2, and 3 having a spring abutment flange 11 at the upper end thereof and a transverse abutment wall 12 inwardly of said upper end. The friction shell section of the casing E, which section is indicated by 20, is of substantially hexagonal, interior cross section, as clearly indicated in Figures 4 and 6, thereby presenting three, longitudinally extending, V-shaped friction surfaces 21, 21, and 21. The friction surfaces 21, 21, and 21, converge inwardly of the casing A, as clearly shown in Figure 5.

The friction member F comprises a tubular section 22 of substantially hexagonal cross section, a transverse inner end wall 23 closing the tubular section 22, and an annular flange 24 at the outer end of said tubular section forming a spring abutment member. The tubular section 22 is tapered inwardly to properly cooperate with the friction surfaces of the friction shell 20 and presents three V-shaped friction surfaces 25, 25, and 25, which engage with the friction surfaces 21, 21, and 21, respectively, of the friction shell 20. As most clearly shown in Figures 5 and 6, the walls of the tubular section 22 of the friction member F are longitudinally slotted between the friction surfaces 25, 25, and 25 thereof, as indicated at 26, 26, and 26, thereby presenting a substantial split friction member, which is contractible radially. The parts are anchored by the bolt H in a manner similar to the bolt D described in connection with Figures 1, 2, and 3. Relative approach of the friction member F and the casing E is yieldingly resisted by the spring G which surrounds the friction casing and the friction member and has its opposite ends bearing on the flanges 11 and 24, respectively, thereof.

The operation of the snubber shown in Figures 4, 5, and 6, is substantially the same as that of the snubber hereinbefore described in connection with Figures 1, 2, and 3, the friction member F being contracted when moved inwardly of the friction shell and the required frictional resistance being obtained by contact between the friction surfaces of said member and shell.

Referring to the embodiment of the invention illustrated in Figure 7, the same comprises a friction shell and cooperating casing, together with the spring resistance means and retainer bolt, corresponding to the contruction shown in Figures 4, 5, and 6, with the exception that the friction member, which is indicated by K, has the tubular section thereof corrugated longitudinally to provide for contraction thereof, instead of being slotted as is the case in the friction member F.

Referring to the embodiment of the invention illustrated in Figure 8, the design thereof is substantially the same as that described in connection with Figures 1, 2, and 3, with the exception that the longitudinal corrugations of the friction member, which is indicated by M, are of a different transverse cross section than the corrugations 16 of the friction member B.

I have herein shown and described what I now consider the preferred manner of carrying out my invention, but the same is merely illustrative and I contemplate all changes and modifications that come within the scope of the claims appended hereto.

I claim:

1. In a shock absorbing mechanism, the combination with a non-expandible friction casing having an inwardly tapered friction shell section; of a one-piece friction member telescoped within said friction shell section and movable inwardly and outwardly of the shell, said member including a tubular section closed at the inner end by a transverse wall and having a spring abutment at the outer end, said tubular section being radially contractible; and a spring resistance bearing on said abutment and opposing relative movement of the casing and friction member.

2. In a shock absorbing mechanism, the combination with a non-expandible friction casing having an inwardly tapered friction shell section; of a one-piece friction member telescoped within said shell and movable inwardly and outwardly of the latter, said friction member including a resilient, radially contractible, tubular portion provided with a continuous, rigid, laterally extending, annular flange; means for anchoring said member to the casing and limiting relative separation of said member and casing; and spring means bearing on said annular flange and opposing relative approach of said casing and member.

3. In a shock absorbing mechanism, the combination with a non-expandible friction casing having an inwardly-tapered friction shell section; of a friction member telescoped within said shell section and movable inwardly and outwardly of the casing, said member including a resilient tubular section, said tubular section being longitudinally corrugated to permit radial contraction of said section; and yielding means opposing relative approach of said casing and member.

4. In a shock absorbing mechanism, the combination with a friction casing having a tapered friction shell section, said section having transversely curved, interior friction surfaces; of a resilient, tubular friction member telescoped within said shell section, said tubular member having transversely curved friction surfaces engaging the friction surfaces of said shell, said member having inwardly directed, longitudinal corrugations between the friction surfaces thereof to permit radial contraction of said member; and spring means opposing relative approach of said casing and member.

5. In a shock absorbing mechanism, the combination with a casing having a friction shell section at one end thereof of hexagonal, interior cross section; of a resilient, tubular friction member of hexagonal cross section telescoped within the friction shell section, said member engaging the friction surfaces of the shell, said member having longitudinal, inwardly directed, corrugations to permit radial contraction thereof; and spring means opposing relative approach of said casing and member.

6. In a shock absorbing mechanism, the combination with a friction casing having a friction shell section at the inner end thereof and a spring abutment flange at the outer end; of a friction member telescoped within the casing, said member including a radially contractible, tubular section cooperating with said friction shell, said tubular section being closed at the inner end by a continuous wall and having a continuous, annular spring abutment flange at the outer end; and a spring interposed between said flanges and opposing relative approach of said casing and member.

7. In a shock absorbing mechanism, the combination with a friction casing having a friction shell section at the inner end, a spring abutment flange at the outer end, and an interior transverse wall between said friction shell section and said outer end; of a friction member including a contractible, resilient, tubular section telescoped within said friction shell section, said friction member having a continuous, solid transverse wall closing the inner end of said tubular section, said member having a spring abutment flange at the outer end thereof; a spring interposed between said flanges and yieldingly resisting relative approach of said casing and member; and a retainer bolt anchored to said transverse walls of said casing and member respectively and limiting relative separation of said casing and member.

8. In a shock absorbing mechanism, the combination with a friction casing having an exterior, annular flange at the outer end, and a friction shell section at the inner end; of a hollow friction member telescoped within said friction shell section, said member having an exterior, annular flange at the outer end and being closed by a transverse wall at the inner end, said member including a resilient, tubular section between said ends engaging the friction surfaces of the shell, said tubular section being longitudinally corrugated to permit radial contraction thereof; and spring means enclosing said shell and friction member and bearing on the flanges of said casing and member.

9. In a shock absorbing mechanism, the combination with a casing having a friction shell section at the inner end; of a hollow friction member telescoped within said casing and movable inwardly and outwardly thereof, said member including a tubular section closed at the inner end by a wall integral therewith, said tubular section having longitudinal friction surfaces cooperating with the friction shell section, said tubular section being longitudinally corrugated between said friction surfaces to permit said tubular section to contract radially; a spring abutment flange at the outer end of said friction member integral with said member; and spring means bearing on said flange and opposing relative approach of said casing and member.

10. In a shock absorbing mechanism, the combination with a casing having a friction shell section at the inner end; of a hollow friction member telescoped within said casing and movable inwardly and outwardly thereof, said member including a tubular section closed at the inner end by a continuous, solid wall integral therewith, said tubular section having longitudinal friction surfaces cooperating with the friction shell section, said tubular section being longitudinally split between said friction surfaces to permit said tubular section to contract radially; a continuous, annular spring abutment flange at the outer end of said friction member integral with said member; and spring means bearing on said flange and opposing relative approach of said casing and member.

11. In a shock absorbing mechanism, the combination with a casing having a friction shell section at the inner end; of a hollow friction member telescoped within said casing and movable inwardly and outwardly thereof, said member including a tubular section closed at the inner end by a continuous, solid wall integral therewith, said tubular section having longitudinal friction surfaces cooperating with the friction shell section, said tubular section being longitudinally slotted between said friction surfaces to permit said tubular section to contract radially; a continuous, annular spring abutment flange at the outer end of said friction member integral with said member; and spring means bearing on said flange and opposing relative approach of said casing and member.

ARNOLD E. DENTLER.